United States Patent
Xie

(10) Patent No.: US 12,440,966 B2
(45) Date of Patent: Oct. 14, 2025

(54) METHOD FOR CONTROLLING BIPED ROBOT, BIPED ROBOT, AND READABLE STORAGE MEDIUM

(71) Applicant: Beijing Xiaomi Robot Technology Co., Ltd., Beijing (CN)

(72) Inventor: Yan Xie, Beijing (CN)

(73) Assignee: Beijing Xiaomi Robot Technology Co., Ltd., Beijing (CN)

( * ) Notice: Subject to any disclaimer, the term of this patent is extended or adjusted under 35 U.S.C. 154(b) by 272 days.

(21) Appl. No.: 18/087,668

(22) Filed: Dec. 22, 2022

(65) Prior Publication Data

US 2024/0051121 A1    Feb. 15, 2024

(30) Foreign Application Priority Data

Aug. 10, 2022   (CN) .......................... 202210957726.9

(51) Int. Cl.
*B25J 9/16* (2006.01)
*B62D 57/032* (2006.01)

(52) U.S. Cl.
CPC ........... *B25J 9/1602* (2013.01); *B25J 9/1633* (2013.01); *B62D 57/032* (2013.01); *G05B 2219/39001* (2013.01); *G05B 2219/41406* (2013.01)

(58) Field of Classification Search
CPC ..... B25J 9/1602; B25J 9/1633; B62D 57/032; G05B 2219/39001; G05B 2219/41406
See application file for complete search history.

(56) References Cited

U.S. PATENT DOCUMENTS

| | | | |
|---|---|---|---|
| 2004/0206164 A1* | 10/2004 | Kawai .................. | B62D 57/032 73/65.07 |
| 2005/0240308 A1* | 10/2005 | Kaneko ................ | B62D 57/032 700/245 |
| 2011/0178639 A1* | 7/2011 | Kwon .................. | B62D 57/032 901/1 |
| 2012/0277910 A1* | 11/2012 | Doi ...................... | B62D 57/032 901/1 |
| 2013/0158712 A1* | 6/2013 | Lee ........................ | G05B 19/04 901/1 |
| 2015/0051734 A1* | 2/2015 | Zheng .................. | B62D 57/032 901/1 |
| 2018/0004208 A1* | 1/2018 | Su .......................... | G05D 1/021 |

(Continued)

FOREIGN PATENT DOCUMENTS

KR    20180003627 A    1/2018

OTHER PUBLICATIONS

NPL Model predictive control of a humanoid robot (Year: 2014).*
Korean Patent Application No. 10-2022-0177830, Office Action dated Jan. 9, 2025, with English translation, 9 pages.

*Primary Examiner* — Mohamad O El Sayah
(74) *Attorney, Agent, or Firm* — Cozen O'Connor

(57) ABSTRACT

A method for controlling a biped robot includes: acquiring a support phase of the biped robot in a current state; acquiring a current forward speed and a current lateral speed of a center of mass of the biped robot at an end of the support phase; acquiring a torque vector of an ankle joint of a support leg of the biped robot according to the current forward speed and the current lateral speed; acquiring a target torque vector according to the torque vector and a preset Quadratic Programming (QP) model; and controlling the biped robot to move according to the target torque vector.

15 Claims, 5 Drawing Sheets

(56) References Cited

U.S. PATENT DOCUMENTS

2020/0206898 A1\* 7/2020 Xiong .................... B25J 13/085
2021/0009218 A1 1/2021 Huang et al.
2022/0379470 A1\* 12/2022 Xie ........................ B25J 9/1633

\* cited by examiner

METHOD FOR CONTROLLING BIPED ROBOT, BIPED ROBOT, AND READABLE STORAGE MEDIUM

CROSS-REFERENCE TO RELATED APPLICATIONS

The present application claims the benefit of priority to Chinese Patent Application Serial No. 202210957726.9, filed on Aug. 10, 2022, the contents of which are incorporated herein by reference in their entireties for all purpose.

BACKGROUND

At present, mobile robots are gradually playing an important role in life, providing all kinds of convenience for people. The mobile robots are classified into wheeled, tracked, and biped robots.

SUMMARY

The present disclosure relates to the field of control technologies, and in particular, to a method for controlling a biped robot, a biped robot, and a readable storage medium.

According to a first aspect of embodiments of the present disclosure, a method for controlling a biped robot is provided, the method including: acquiring a support phase of the biped robot in a current state; acquiring a current forward speed and a current lateral speed of a center of mass of the biped robot at an end of the support phase; acquiring a torque vector of an ankle joint of a support leg of the biped robot according to the current forward speed and the current lateral speed; acquiring a target torque vector according to the torque vector and a preset quadratic programming model; and controlling the biped robot to move according to the target torque vector.

According to a second aspect of embodiments of the present disclosure, a biped robot is provided, including: a memory and a processor; the memory being configured to store a computer program executable by the processor; the processor being configured to execute the computer program in the memory to implement the method as described above.

According to a third aspect of embodiments of the present disclosure, a non-transitory computer-readable storage medium is provided, when an executable computer program in the storage medium is executed by a processor, the method as described above can be implemented.

BRIEF DESCRIPTION OF THE DRAWINGS

The accompanying drawings herein are incorporated in and constitute a part of this specification, illustrate embodiments consistent with the present disclosure and, together with the specification, serve to explain the principles of the present disclosure.

DETAILED DESCRIPTION

Figure 1:
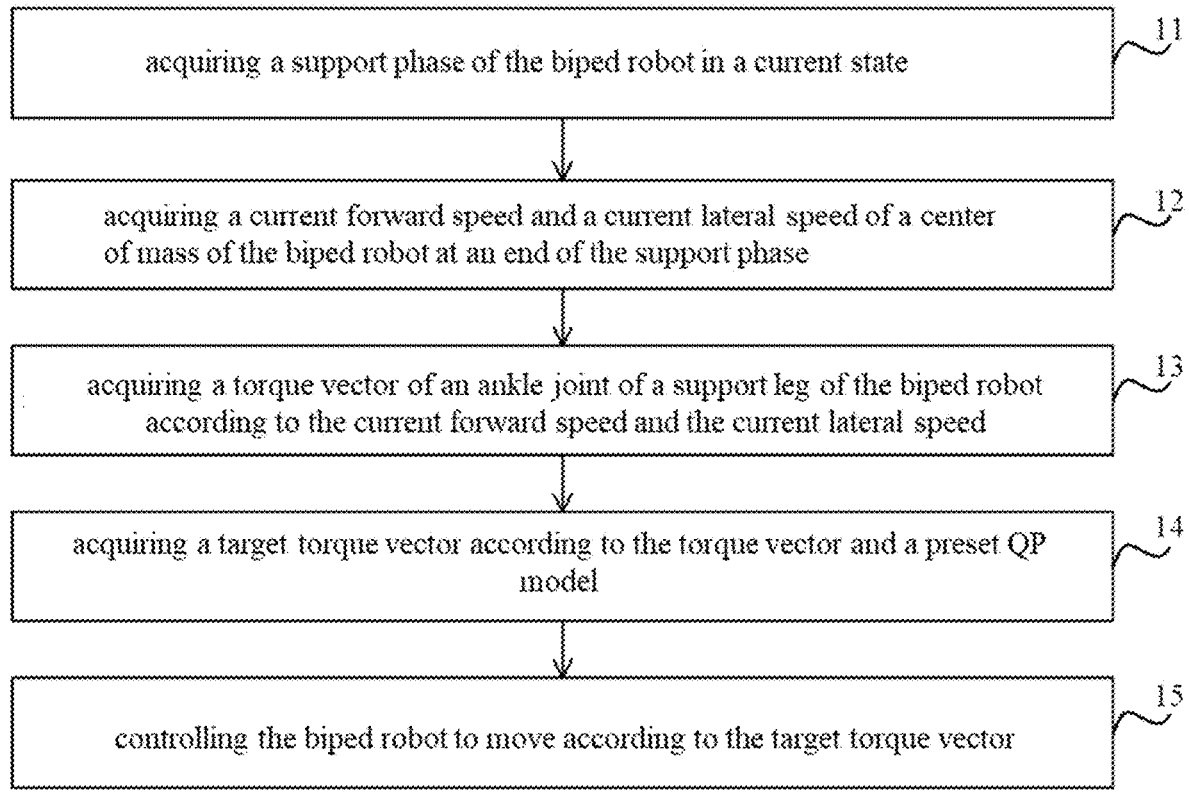
FIG. 1 is a flowchart of a method for controlling a biped robot according to an embodiment.

Illustrative embodiments will be described in detail herein, examples of which are shown in the accompanying drawings. When the following description relates to the accompanying drawings, unless otherwise specified, the same or similar elements are denoted by the same numerals in different accompanying drawings. Embodiments described in the following do not represent all embodiments consistent with the present disclosure. Instead, they are merely examples of apparatuses consistent with some aspects of the embodiments of the present disclosure as recited in the appended claims. It is to be noted that the features in the following embodiments and implementations may be combined with each other without conflict.

At present, mobile robots are gradually playing an important role in life, providing all kinds of convenience for people. The mobile robots are classified into wheeled, tracked, and biped robots. Use of the wheeled and tracked robots in rugged and complex terrain environments is greatly limited. For example, passing ability on gravel ground, rough ground, and the like is affected. However, the biped robots can move only by touching the ground, which has relatively low requirements on the ground and thus has a better prospect of use.

For example, the biped robots are biped/humanoid robots. Based on bionic structure characteristics thereof, the biped/humanoid robots can adapt to more complex terrain and operating environments and replace human to complete dangerous or repetitive work. Walking and running of the biped/humanoid robots typically have characteristics of high nonlinearity, underactuation, a hybrid continuous system, and a discrete system, so an appropriate walking control method for the biped robots is particularly important.

During the motion, regardless of a structured or unstructured external contact environment or regardless of ideal or rugged terrain, dynamics of the biped robots is essentially underactuated based on the following reasons. (1) Gaits of foot motion inevitably have an SSP. (2) Support legs can be subjected only to support force and friction force from contact surfaces. That is, the ground cannot exert tension on the biped robots. Therefore, in the case of high dynamic motion, all actuable degrees of freedom of the support legs of the biped robots cannot achieve complete control over a floating base (or momentum of center of mass) in the SSP.

In order to solve the above technical problems, embodiments of the present disclosure provide a method and apparatus for controlling a biped robot, a biped robot, and a readable storage medium, which are applicable to biped robots. The biped robot may include 0, 1, or 2 ankle joints.

When each leg has 2 ankle joints, a foot may be controlled to pitch and roll in two directions, belonging to a fully actuated state. When each leg has 0 or 1 ankle joint, the foot cannot be controlled to pitch and roll in two directions, belonging to an underactuated state. To convenience of description, the biped robot in subsequent embodiments includes robots in the fully actuated state and the underactuated state. An inventive concept of the present disclosure is to control a forward speed (motion) and a lateral speed (motion) of a center of mass of the biped robot through selection of a foothold and a torque vector of the ankle joint. The center of mass refers to a center of the mass of the biped robot.

In other words, center-of-mass speeds at the end of the SSP and the end of the DSP are tracked by the control over torque of the ankle joint of the support leg. That is, a position of the center of mass relative to the support leg at SSP start time is indirectly controlled by selection of a foothold at the end of the SSP to achieve an effect of predictive control.

Moreover, trajectory tracking of other programmed workspaces (such as a center-of-mass height, a floating-base (such as the robot's torso) attitude angle, a position and an attitude of a swing leg, etc.) is realized through QP-based whole body motion control. The above center-of-mass control may be used as an equality constraint in a QP model. In embodiments of the present disclosure, a control mode of first decomposition and then merging can ensure that a height and a floating-base attitude of the biped robot in the SSP are in the fully actuated state, to achieve an effect of complete control, which has strong robustness and can adapt to the control over dynamic walking of the biped robot in the fully actuated and underactuated states.

FIG. 1 shows a method for controlling a biped robot according to an embodiment. Referring to FIG. 1, the method for controlling a biped robot includes step 11 to step 15.

In step 11, a support phase of the biped robot in a current state is acquired.

Figure 2:
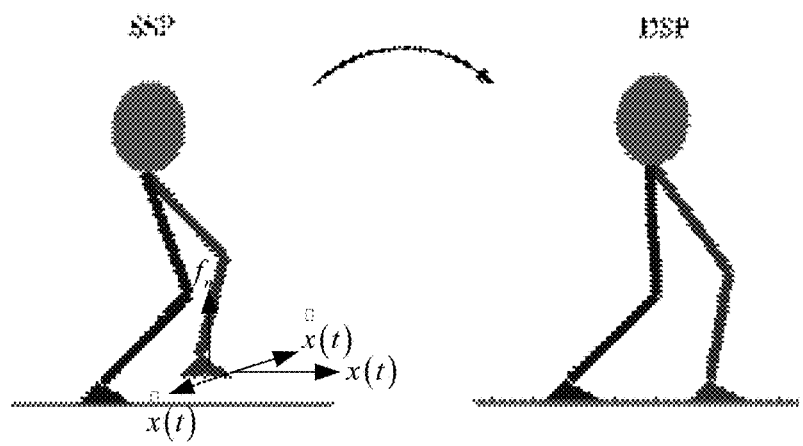
FIG. 2 is a schematic diagram of a single support phase (SSP) and a double support phase (DSP) according to an embodiment.

In this embodiment, a processor of the biped robot may acquire the support phase of the biped robot in the current state. It may be understood that the support phase includes an SSP and a DSP. Referring to FIG. 2, the biped robot includes a support leg in contact with the ground (the left leg in the left picture) and a swing leg off the ground (the right leg in the left picture) in the SSP; and the biped robot includes 2 support legs (the left leg and the right leg in the right picture) in contact with the ground in the DSP. It is to be noted that, considering that the DSP is transformed from the SSP, in the following, one support leg in the DSP, namely the support leg in the SSP, is called a first support leg, and the other support leg in the DSP, namely the swing leg in the SSP, is called a second support leg.

Figure 3:
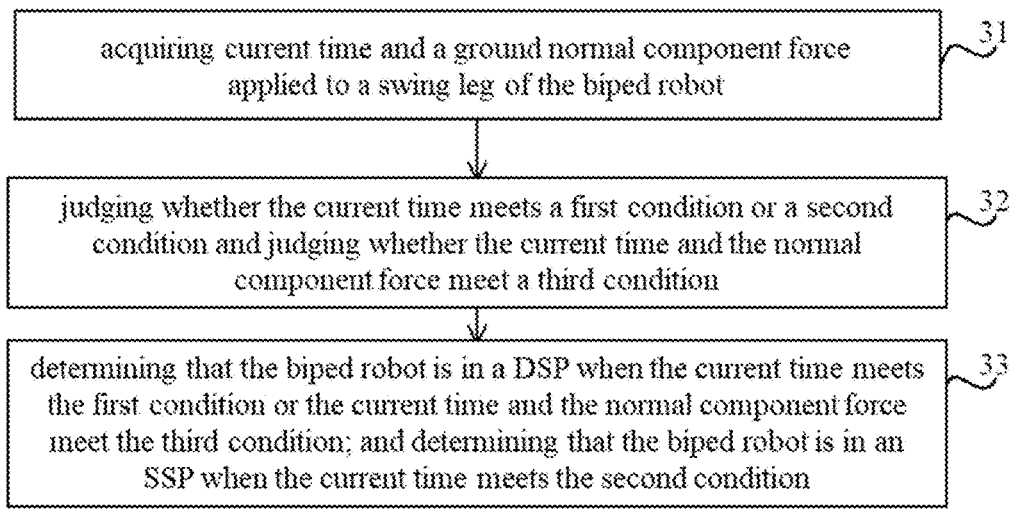
FIG. 3 is a flowchart of acquisition and determination that the biped robot is in the SSP according to an embodiment.

In this embodiment, the processor may determine the support phase of the biped robot according to whether the swing leg of the biped robot lands, which includes step 31 to step 33 as shown in FIG. 3.

In step 31, the processor may acquire current time and a ground normal component force applied to a swing leg of the biped robot.

In step 32, the processor may judge whether the current time meets a first condition or a second condition and judge whether the current time and the normal component force meet a third condition. The first condition is that the current time exceeds a sum of SSP start time and SSP duration. The sum of the SSP start time and the SSP duration is SSP end time.

The second condition is that the current time exceeds a sum of DSP start time and DSP duration. The sum of the DSP start time and the DSP duration is DSP end time.

The third condition is that the current time exceeds a sum of the SSP start time and half of the SSP duration, and the normal component force is greater than a product of a preset coefficient and gravity of the biped robot. The sum of the SSP start time and half of the SSP duration is end time of half of the SSP.

In step 33, the processor may determine that the biped robot is in a DSP when the current time meets the first condition or the current time and the normal component force meet the third condition; or determine that the biped robot is in an SSP when the current time meets the second condition.

Taking the SSP as an example, if the current time is t, the SSP start time is $t_{s0}$, and a nominal support duration of the SSP is $T_s$, it is determined that the current time meets the first condition which is $t>t_{s0}+T_s$, $t_{s0}+T_s$ denotes end time obtained by delaying $T_s$ based on the start time $t_{s0}$. Therefore, $t>t_{s0}+T_s$ indicates that the current time is greater than the end time (i.e., $t_{s0}+T_s$). It may be understood that addition of time and duration as referred to in subsequent embodiments also means solving an end time.

In another example, estimated normal component force applied to the swing leg is $f_n$, $\alpha$ denotes a coefficient greater than 0 and less than 0.5, m denotes mass of the biped robot, g denotes gravitational acceleration, and then it is determined that the current time and the normal component force meet the third condition which is $(t>t_{s0}+0.5T_s)\cap(f_n>\alpha mg)$, where mg denotes the gravity of the biped robot.

Taking the DSP as an example, if the current time is t, the DSP start time is $t_{d0}$, and a nominal DSP duration is $T_d$, it is determined that the current time meets the second condition which is $t>t_{d0}+T_d$.

In step 12, a current forward speed and a current lateral speed of a center of mass of the biped robot at the end of the support phase are acquired.

Figure 4:
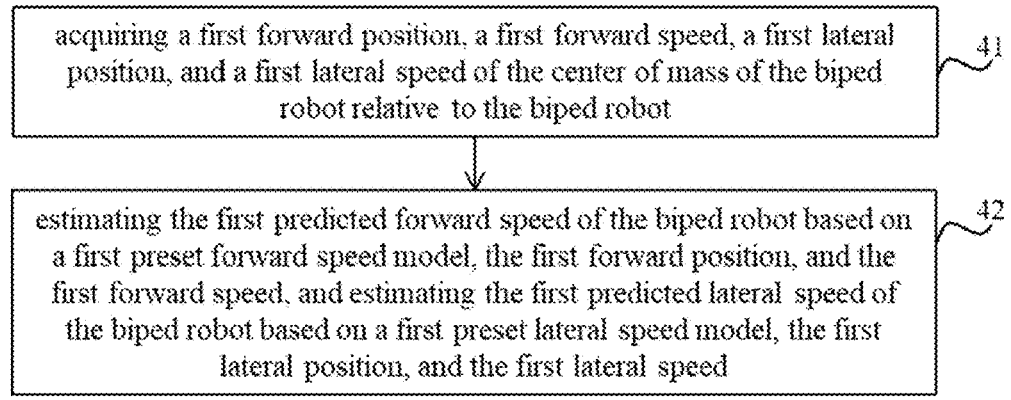
FIG. 4 is a flowchart of acquisition of a first predicted forward speed and a first predicted lateral speed according to an embodiment.

In an embodiment, for example, the support phase includes an SSP. In this case, the forward speed includes a first predicted forward speed, and the lateral speed includes a first predicted lateral speed. Referring to FIG. 4, the processor may acquire the current forward speed and the current lateral speed of the center of mass of the biped robot at the end of the support phase, which includes step 41 to step 42.

In step 41, the processor may acquire a first forward position, a first forward speed, a first lateral position, and a first lateral speed of the center of mass of the biped robot relative to the biped robot.

In this step, when a state of the center of mass in the SSP is predicted, the biped robot is regarded as a Linear Inverted Pendulum Model (LIP). It is assumed that a forward position (hereinafter referred to as a first forward position), a forward speed (hereinafter referred to as a first forward speed), a lateral position (hereinafter referred to as a first lateral position), and a lateral speed (hereinafter referred to as a first lateral speed) of the center of mass of the biped robot relative to the support leg may be obtained through direct kinematics and state estimation.

In step 42, the processor may estimate the first predicted forward speed of the biped robot based on a first preset forward speed model, the first forward position, and the first forward speed, and estimate the first predicted lateral speed of the biped robot based on a first preset lateral speed model, the first lateral position, and the first lateral speed.

Assuming that the first forward position and the first forward speed are [x(t), ẋ(t)] and the first lateral position and the first lateral speed are [y(t), ẏ(t)], the first forward speed and the first lateral speed of the center of mass of the biped robot in the SSP may be predicted and estimated through the following formula (1) according to the first preset forward speed model and the first preset lateral speed model:

$$\begin{cases} \dot{x}^-_{est} = \lambda \sinh(\lambda(T_s + t_{s0} - t))x(t) + \cosh(\lambda(T_s + t_{s0} - t))\dot{x}(t) \\ \dot{y}^-_{est} = \lambda \sinh(\lambda(T_s + t_{s0} - t))y(t) + \cosh(\lambda(T_s + t_{s0} - t))\dot{y}(t) \end{cases} \quad (1)$$

In the formula (1)

$$\lambda = \sqrt{\frac{g}{z(t)}}, z(t)$$

denotes a height of the center of mass relative to the support leg obtained by state estimation in this case, $T_s$ denotes a nominal support phase duration of the SSP, $t_{s0}$ denotes the SSP start time, t denotes the current time, and sinh and cosh denote a hyperbolic sine function and a hyperbolic cosine function respectively.

It may be understood that the first preset forward speed model and the first preset lateral speed model are built based on the LIP.

Figure 5:
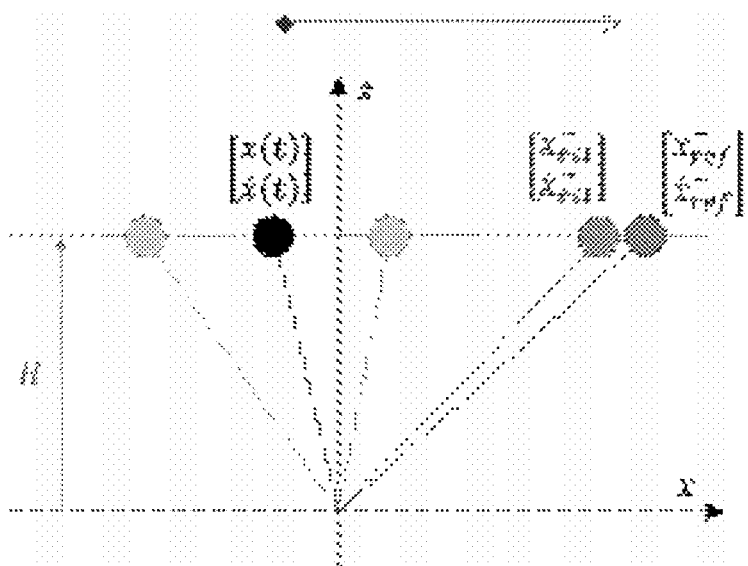
FIG. 5 is a schematic diagram of a height between a center of mass and a contact surface according to an embodiment.

Taking forward motion as an example, the height of the center of mass of the biped robot relative to the support leg is shown in FIG. 5. Referring to FIG. 5, a height of the center of mass (black sphere) from a horizontal axis x is H, and from left to right are sequentially the first forward position and the first forward speed [x(t), ẋ(t)], a first predicted forward speed and a first predicted lateral speed [ẋ*$_{est}$, ẋ*$_{ref}$], and a current-step forward speed and a current-step lateral speed [ẋ*$_{ref}$, ẋ*$_{ref}$].

Figure 6:
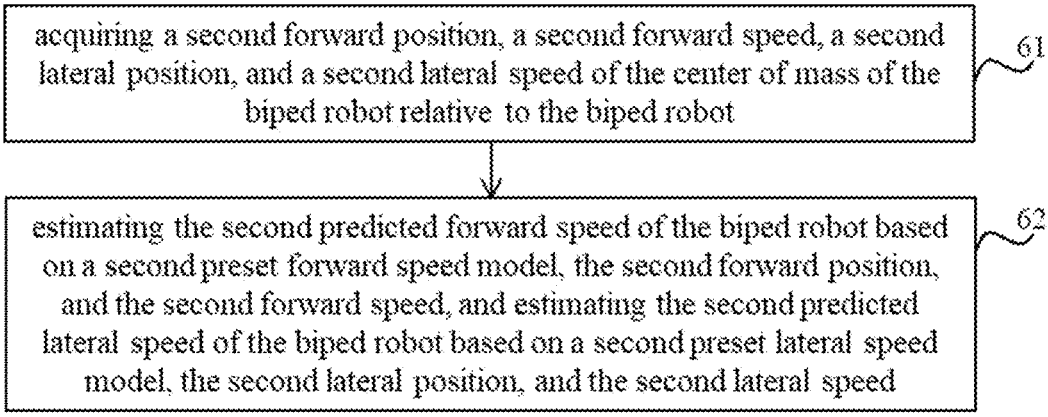
FIG. 6 is a flowchart of acquisition of a second predicted forward speed and a second predicted lateral speed according to an embodiment.

In an embodiment, for example, the support phase includes a DSP. In this case, the forward speed includes a second predicted forward speed, and the lateral speed includes a second predicted lateral speed. Referring to FIG. 6, the processor may acquire the current forward speed and the current lateral speed of the center of mass of the biped robot at the end of the support phase, which includes step 61 to step 62.

In step 61, the processor may acquire a second forward position, a second forward speed, a second lateral position, and a second lateral speed of the center of mass of the biped robot relative to the biped robot. In this step, a uniform velocity model is used in the prediction of the state of the center of mass at the end of the DSP. That is, the speed of the center of mass of the biped robot is assumed to be constant. It is assumed that, through direct kinematics and state estimation, a forward position (hereinafter referred to as a second forward position) and a forward speed (hereinafter referred to as a second forward speed) of the center of mass of the biped robot relative to the support leg are estimated, in which the second forward position and the second forward speed are [x(t), ẋ(t)]; and a lateral position (hereinafter referred to as a second lateral position) and a lateral speed (hereinafter referred to as a second lateral speed) of the center of mass of the biped robot relative to the support leg are estimated, in which the second lateral position and the second lateral speed are [y(t), ẏ(t)].

In step 62, the processor may estimate the second predicted forward speed of the biped robot based on a second preset forward speed model, the second forward position, and the second forward speed, and estimate the second predicted lateral speed of the biped robot based on a second preset lateral speed model, the second lateral position, and the second lateral speed. The second predicted forward speed and the second predicted lateral speed may be predicted and estimated through the following formula (2):

$$\begin{cases} \dot{x}^-_{est} = \ddot{x}(t)(T_d + t_{d0} - t) \\ \dot{y}^-_{est} = \ddot{y}(t)(T_d + t_{d0} - t) \end{cases} \quad (2)$$

In the formula (2), $T_d$ denotes the nominal DSP duration, and $t_{d0}$ denotes the DSP start time.

It may be understood that the second preset forward speed model and the second preset lateral speed model in step 62 are built based on the uniform velocity model.

In step 13, a torque vector of an ankle joint of a support leg of the biped robot is acquired according to the current forward speed and the current lateral speed.

Figure 7:
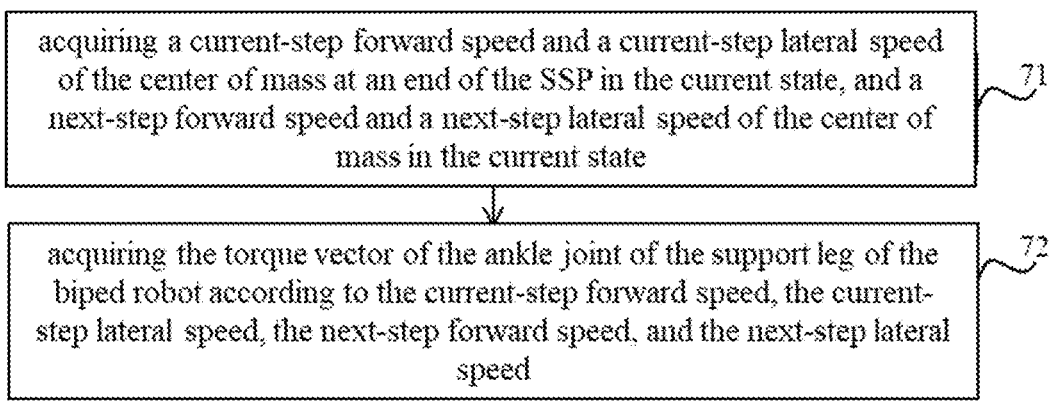
FIG. 7 is a flowchart of acquisition of a torque vector of an ankle joint in the SSP according to an embodiment.

In an embodiment, for example, the biped robot is in the SSP, and the processor may acquire the torque vector of the ankle joint of the support leg of the biped robot according to the current forward speed and the current lateral speed, which includes step 71 to step 72 as shown in FIG. 7.

In step 71, the processor may acquire a current-step forward speed and a current-step lateral speed of the center of mass at the end of the SSP in the current state, and a next-step forward speed and a next-step lateral speed of the center of mass in the current state. Still referring to FIG. 5, the current-step forward speed and the current-step lateral speed are ẋ$_{ref}$ and ẏ$_{ref}$ respectively, and a forward speed and a lateral speed of the center of mass in next step in the current state are ẋ$_{ref}^{next}$ and ẏ$_{ref}^{next}$ respectively. For convenience of description, the forward speed and the lateral speed in next step are referred to as a next-step forward speed ẋ$_{ref}^{next}$ and a next-step lateral speed ẏ$_{ref}^{next}$ respectively in subsequent embodiments.

In step 72, the processor may acquire the torque vector of the ankle joint of the support leg of the biped robot according to the current-step forward speed, the current-step lateral speed, the next-step forward speed, and the next-step lateral speed, as shown in the following formula (3):

$$\tau^1_{q_{ankle}} = (J^1_{ankle})^T \begin{bmatrix} k_x^\tau (\dot{x}^-_{ref} - \dot{x}^-_{est}) \\ k_y^\tau (\dot{y}^-_{ref} - \dot{y}^-_{est}) \end{bmatrix}; \quad (3)$$

In the formula (3), $\tau^1_{q_{ankle}}$ denotes the torque vector corresponding to the ankle joint (less than or equal to 2) of the support leg in the SSP, $J^1_{ankle}$ denotes parts of the forward speed and the lateral speed of the center of mass corresponding to the speed of the ankle joint of the support leg in a generalized Jacobian matrix of the speed of the center of mass of the biped robot, and $k_x^\tau$ and $k_y^\tau$ denote gains greater than 0 respectively.

The torque of the ankle joint of the swing leg in the SSP does not participate in the control over the speed of the center of mass, but acts on the control over the attitude of the swing leg. If the ankle joint of the biped robot is in the underactuated state, that is, an actuable degree of freedom of the ankle joint is 0 or 1, and a corresponding term of $J^1_{ankle}$ is 0. Therefore, the formula (3) is applicable to the ankle joint in the fully actuated state and the underactuated state.

Figure 8:
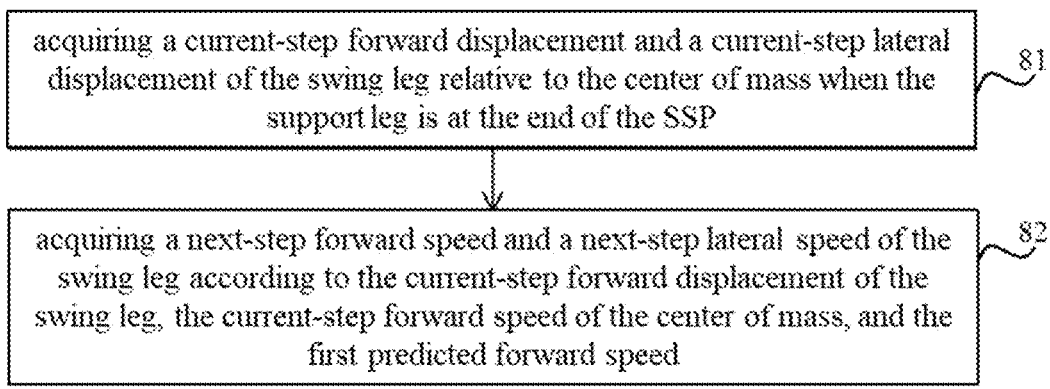
FIG. 8 is a flowchart of acquisition of a next-step forward speed and a next-step lateral speed according to an embodiment.

In an embodiment, the processor may modify programming of the swing leg in the SSP, which includes step 81 to step 82 as shown in FIG. 8.

In step 81, the processor may acquire a current-step forward displacement and a current-step lateral displacement of the swing leg relative to the center of mass when the support leg is at the end of the SSP. It is assumed that the current-step forward displacement and the current-step lateral displacement of the swing leg relative to the center of mass at the end of the SSP (i.e., the time when the swing leg lands) given by upper level programming are $_{foot}\bar{x}_{ref}$ and $_{foot}\bar{y}_{ref}$ respectively.

In step 82, the processor may acquire a next-step forward speed and a next-step lateral speed of the swing leg according to the current-step forward displacement of the swing leg, the current-step forward speed of the center of mass, and the first predicted forward speed, as shown in the following formula (4):

$$\begin{cases} _{foot}\bar{x}_{ref} = {_{foot}}\bar{x}_{ref} - k_y^{foot}\left(\bar{x}_{ref}^{-next} - \bar{x}_{est}^{-}\right) \\ _{foot}\bar{y}_{ref} = {_{foot}}\bar{y}_{ref} - k_y^{foot}\left(\bar{y}_{ref}^{-next} - \bar{y}_{est}^{-}\right) \end{cases} \quad (4)$$

In the formula (4), $k_x^{foot}$ and $k_y^{foot}$ denote gains greater than 0 respectively.

Figure 9:
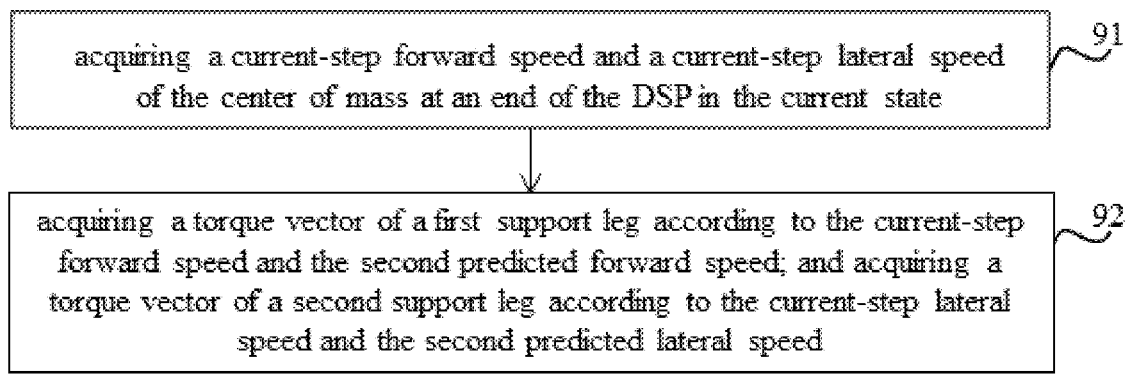
FIG. 9 is a flowchart of acquisition of a torque vector of a support leg according to an embodiment.

In another embodiment, for example, the biped robot is in the SSP, and the processor may acquire the torque vector of the ankle joint of the support leg of the biped robot according to the current forward speed and the current lateral speed, which includes step 91 to step 92 as shown in FIG. 9.

In step 91, the processor may acquire a current-step forward speed and a current-step lateral speed of the center of mass at the end of the DSP in the current state. It is assumed that a current-step forward speed and a current-step lateral speed of the center of mass of a current step at the end of the DSP given by upper level programming are $\dot{x}_{ref}^{-}$ and $\dot{y}_{ref}^{-}$ respectively.

In step 92, the processor may acquire a torque vector of a first support leg according to the current-step forward speed and the second predicted forward speed; and acquire a torque vector of a second support leg according to the current-step lateral speed and the second predicted lateral speed; the first support leg being a support leg in the SSP prior to the DSP, the second support leg being a swing leg in the SSP prior to the DSP. In this step, the following control law may be used for preset control over the forward speed and the lateral speed of the center of mass, which can ensure smooth transition of the speed of the center of mass between the first support leg (original support leg) and the second support leg (new support leg), as shown in the following formula (5):

$$\begin{cases} \tau_{q_{ankle}}^1 = \left(1 - \frac{t - t_{d0}}{T_d}\right)(J_{ankle}^1)^T \begin{bmatrix} k_x^T(\dot{x}_{ref}^{-} - \dot{x}_{est}^{-}) \\ k_y^T(\dot{y}_{ref}^{-} - \dot{y}_{est}^{-}) \end{bmatrix} \\ \tau_{q_{ankle}}^2 = \frac{t - t_{d0}}{T_d}(J_{ankle}^2)^T \begin{bmatrix} k_x^T(\dot{x}_{ref}^{-} - \dot{x}_{est}^{-}) \\ k_y^T(\dot{y}_{ref}^{-} - \dot{y}_{est}^{-}) \end{bmatrix} \end{cases} \quad (5)$$

In the formula (5), $\tau_{ankle}^1$ and $\tau_{ankle}^2$ denote torque vectors of the first support leg and the second support leg respectively, and $J_{ankle}^1$ and $J_{ankle}^2$ denote parts of the forward speed and the lateral speed of the center of mass corresponding to the speed of the ankle joint of the first support leg or the second support leg in the generalized Jacobian matrix of the speed of the center of mass of the biped robot respectively.

In step 14, a target torque vector is acquired according to the torque vector and a preset QP model.

Figure 10:
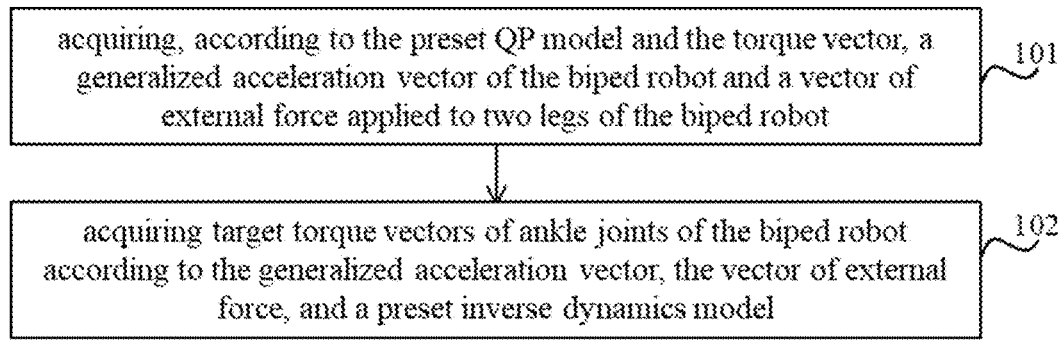
FIG. 10 is a flowchart of acquisition of target torque vectors of joints according to an embodiment.

In this embodiment, the processor may acquire the target torque vector according to the torque vector and the preset QP model, which includes step 101 to step 102 as shown in FIG. 10.

In step 101, the processor may acquire, according to the preset QP model and the torque vector, a generalized acceleration vector of the biped robot and a vector of external force applied to two legs of the biped robot. The generalized acceleration vector includes acceleration vectors of ankle joints and an acceleration vector of a floating base (e.g., torso) of the biped robot. In this step, real-time whole body motion control of the biped robot is described as a QP model. It is assumed that a workspace reference trajectory vector (such as a center-of-mass height, a floating-base attitude angle, a position and an attitude of a swing leg, etc.) of the biped robot outputted by upper level programming is $\xi^{ref}$, and a corresponding vector obtained by state estimation is $\xi^{est}$. In order to make the biped robot track the reference trajectory when necessary physical constraints (such as torque saturation, contact friction cone constraints, etc.) are met, the QP model is built, as shown in the following formula (6):

$$\min_{\ddot{q},f_c}\left\{\|J_\xi\ddot{q} + \dot{J}_\xi\dot{q} - \ddot{\xi}^{des}\|_{W_1}^2 + \|f_c\|_{W_2}^2 + \|f_c - f_c^-\|_{W_3}^2\right\} \quad (6)$$

s.t.

$$S_f(M\ddot{q} + v) = S_f J_c^T f_c$$

$$\tau = S_j\left(-M\ddot{q} - v + J_c^T f_c\right)$$

$$\ddot{\xi}^{des} = \ddot{\xi}^{ref} + K_p\left(\xi^{ref} - \xi^{est}\right) + K_d\left(\dot{\xi}^{ref} - \dot{\xi}^{est}\right)$$

$$Uf_c \leq 0$$

$$\|\tau\| \leq \tau^{max}$$

$$\|\ddot{q}\| \leq \ddot{q}^{max};$$

In the formula (6), $\ddot{q}$ denotes the generalized acceleration vector of the biped robot, $\ddot{q}^{max}$ denotes a maximum value of the acceleration vector, $f_c$ denotes the vector of external force applied to the two legs of the biped robot, M and v denote an inertia matrix and a nonlinear term, $f_c^-$ denotes contact force optimized by a previous frame (or a previous step), and $J_c$ denotes a speed Jacobian matrix of contact points; $Uf_c \leq 0$ denotes a boundary constraint and a linearized friction cone constraint of the contact force, * denotes a weight matrix of a task *, $K_p$ and $K_d$ denote proportional differential gain matrices of feedback control respectively, $S_f$ denotes a floating-base selection matrix, z denotes the torque vector, and $\tau^{max}$ denotes a maximum value of torques.

A dynamics model of the two-legged model may be obtained based on the QP model, as shown in the following formula (7):

$$M\ddot{q} + v = S_j^T \tau + J_c^T f_c \quad (7)$$

It may be understood that, in addition to the above constraints, the SSP further includes an equality constraint such as the formula (3), and the DSP further includes an equality constraint such as the formula (5).

In step 102, the processor may acquire target torque vectors of ankle joints of the biped robot according to the generalized acceleration vector, the vector of external force, and a preset inverse dynamics model. In this step, the acceleration vector q̈ and the vector of external force $f_c$ applied to the two legs of the biped robot may be acquired, with values of q̈* and $f^*_c$ respectively. Then, the processor may calculate target torque vectors of joints of the biped robot according to an inverse dynamics model, as shown in the following formula (8):

$$\tau^* = S_j(-M\ddot{q}^* - v + J_c^T f^*_c); \quad (8)$$

In step 15, the biped robot is controlled to move according to the target torque vector.

In this embodiment, the processor, after obtaining the target torque vectors of the ankle joints, send the target torque vectors to the ankle joints to cause the ankle joints to move, to control the biped robot.

Thus, in the solution according to embodiments of the present disclosure, the support phase of the biped robot in the current state can be acquired; then, the current forward speed and the current lateral speed of the center of mass of the biped robot at the end of the support phase are acquired; afterwards, the torque vector of the ankle joint of the support leg of the biped robot is acquired according to the current forward speed and the current lateral speed; the target torque vector is acquired according to the torque vector and the preset QP model; and finally, the biped robot is controlled to move according to the target torque vector. In this way, in this embodiment, the center of mass of the biped robot is controlled to move forward and move laterally through the torque vector of the ankle joint, to achieve an effect of controlling two legs. Moreover, in this embodiment, whole body motion of the biped robot can be controlled by QP, so that (fully actuated and underactuated) biped robots are all in a fully actuated state and have strong robustness.

Figure 11:
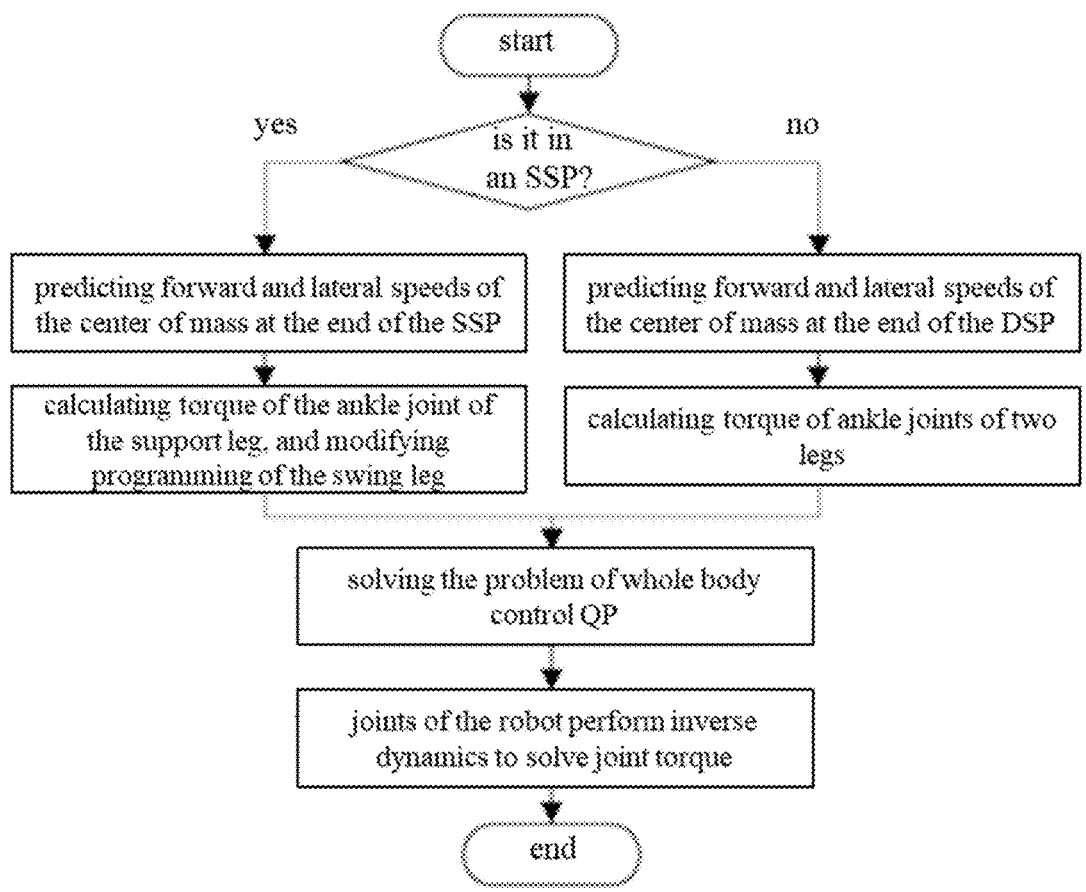
FIG. 11 is a flowchart of another method for controlling a biped robot according to an embodiment.

A solution of a method for controlling a biped robot according to an embodiment of the present disclosure is described below with reference to FIG. 11. Refer to FIG. 11.

The processor may judge whether the biped robot is in the SSP.

If the biped robot is in the SSP, a forward speed (i.e., a first predicted forward speed) and a lateral speed (i.e., a first predicted lateral speed) of the center of mass at the end of the SSP are predicted, a torque vector of an ankle joint of a support leg is calculated, and programming of a swing leg is modified. If the biped robot is in the DSP, a forward speed (i.e., a second predicted forward speed) and a lateral speed (i.e., a second predicted lateral speed) of the center of mass at the end of the DSP are predicted, and then the torque vectors of the ankle joints of the two support legs are calculated.

The processor may solve the QP problem of whole body control according to the predicted forward speed, the predicted lateral speed, and the QP model described above, to obtain the generalized acceleration vector of the biped robot and the vector of external force applied to the two legs of the biped robot. Then, the processor may calculate target torque vectors of ankle joints according to the inverse dynamics model, and control the biped robot according to the target torque vectors.

In embodiments of the present disclosure, the method for controlling a biped robot is applicable to biped robots in the fully actuated state and the underactuated state, and forward motion and lateral motion of the center of mass of the robot are controlled by selection of a foothold and joint torque of the ankle joint. That is, speeds of the center of mass at the end of the SSP and the end of the DSP are tracked by the control over the torque vector of the ankle joint of the support leg. The position of the center of mass relative to the support leg at the SSP start time is indirectly controlled through selection of the foothold at the end of the SSP, bringing a predictive control effect. Moreover, in this embodiment, trajectory tracking of other programmed workspaces (such as a center-of-mass height, a floating-base attitude angle, a position and an attitude of a swing leg, etc.) is realized through QP-based whole body motion control, and the above center-of-mass control may be used as an equality constraint in the QP problem. In this embodiment, with the control method of first decomposition and then merging, the height and floating-base attitude of the robot in the SSP are in the fully actuated state, which is completely controllable. Compared with other methods, a tracking control effect of the height of the center of mass and the floating-base attitude is significantly improved. At the same time, the control method in the present disclosure makes use of predictive information and passive dynamics characteristics, and has strong robustness, which can well adapt to the control over dynamic walking of fully actuated and underactuated biped robots.

Figure 12:
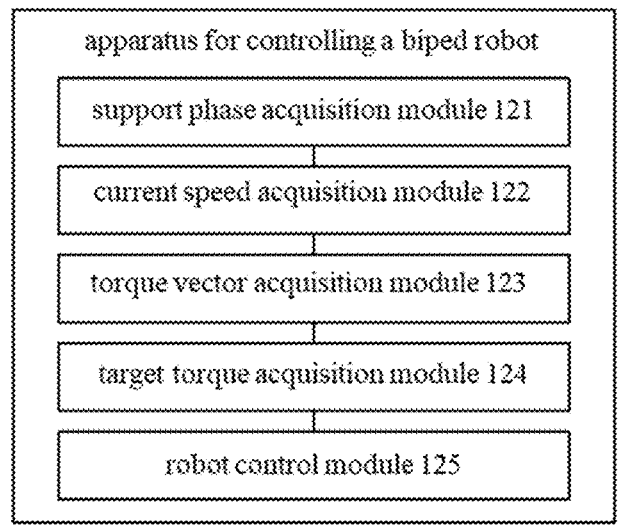
FIG. 12 is a block diagram of an apparatus for controlling a biped robot according to an embodiment.

On the basis of the method for controlling a biped robot according to embodiments of the present disclosure, embodiments of the present disclosure further provide an apparatus for controlling a biped robot. Referring to FIG. 12, the apparatus includes: a support phase acquisition module 121 configured to acquire a support phase of the biped robot in a current state; a current speed acquisition module 122 configured to acquire a current forward speed and a current lateral speed of a center of mass of the biped robot at the end of the support phase; a torque vector acquisition module 123 configured to acquire a torque vector of an ankle joint of a support leg of the biped robot according to the current forward speed and the current lateral speed; a target torque acquisition module 124 configured to acquire a target torque vector according to the torque vector and a preset QP model; and a robot control module 125 configured to control the biped robot to move according to the target torque vector.

In an embodiment, the support phase acquisition module includes: a time acquisition sub-module configured to acquire current time; a normal component force acquisition sub-module configured to acquire ground normal component force applied to a swing leg of the biped robot; a condition judgment sub-module configured to judge whether the current time meets a first condition or a second condition and judge whether the current time and the normal component force meet a third condition; the first condition being that the current time exceeds a sum of SSP start time and SSP duration, the second condition being that the current time exceeds a sum of DSP start time and DSP duration, the third condition being that the current time exceeds a sum of the SSP start time and half of the SSP duration, and the normal component force being greater than a product of a preset coefficient and gravity of the biped robot; and a support phase determination sub-module configured to determine that the biped robot is in a DSP when the current time meets the first condition or the current time and the normal component force meet the third condition; and determine that the biped robot is in an SSP when the current time meets the second condition.

In an embodiment, the support phase includes an SSP, the forward speed includes a first predicted forward speed, the lateral speed includes a first predicted lateral speed, and the current speed acquisition module includes: a position speed acquisition sub-module configured to acquire a first forward position, a first forward speed, a first lateral position, and a first lateral speed of the center of mass of the biped robot relative to the biped robot; a first forward speed acquisition sub-module configured to estimate the first predicted forward speed of the biped robot based on a first preset forward speed model, the first forward position, and the first forward speed; and a first lateral speed acquisition sub-module configured to estimate the first predicted lateral speed of the biped robot based on a first preset lateral speed model, the first lateral position, and the first lateral speed.

In an embodiment, the torque vector acquisition module includes: a current-step speed acquisition sub-module configured to acquire a current-step forward speed and a current-step lateral speed of the center of mass at the end of the SSP in the current state; a next-step speed acquisition sub-module configured to acquire a next-step forward speed and a next-step lateral speed of the center of mass in the current state; and a torque vector acquisition sub-module configured to acquire the torque vector of the ankle joint of the support leg of the biped robot according to the current-step forward speed, the current-step lateral speed, the next-step forward speed, and the next-step lateral speed.

In an embodiment, the apparatus further includes: a swing leg displacement acquisition module configured to acquire a current-step forward displacement and a current-step lateral displacement of the swing leg relative to the center of mass when the support leg is at the end of the SSP; and a next-step speed acquisition module configured to acquire a next-step forward speed and a next-step lateral speed of the swing leg according to the current-step forward displacement of the swing leg, the current-step forward speed of the center of mass, and the first predicted forward speed.

In an embodiment, the support phase includes a DSP, the forward speed includes a second predicted forward speed, the lateral speed includes a second predicted lateral speed, and the current speed acquisition module includes: a position speed acquisition sub-module configured to acquire a second forward position, a second forward speed, a second lateral position, and a second lateral speed of the center of mass of the biped robot relative to the biped robot; a second forward speed acquisition sub-module configured to estimate the second predicted forward speed of the biped robot based on a second preset forward speed model, the second forward position, and the second forward speed; and a second lateral speed acquisition sub-module configured to estimate the second predicted lateral speed of the biped robot based on a second preset lateral speed model, the second lateral position, and the second lateral speed.

In an embodiment, the torque vector acquisition module includes: a current-step speed acquisition sub-module configured to acquire a current-step forward speed and a current-step lateral speed of the center of mass at the end of the DSP in the current state; a first torque vector acquisition sub-module configured to acquire a torque vector of a first support leg according to the current-step forward speed and the second predicted forward speed; and a second torque vector acquisition sub-module configured to acquire a torque vector of a second support leg according to the current-step lateral speed and the second predicted lateral speed; the first support leg being a support leg in the SSP prior to the DSP, the second support leg being a swing leg in the SSP prior to the DSP.

In an embodiment, the target torque acquisition module includes: a vector acquisition sub-module configured to acquire, according to the preset QP model and the torque vector, a generalized acceleration vector of the biped robot and a vector of external force applied to two legs of the biped robot; and a target torque acquisition sub-module configured to acquire target torque vectors of ankle joints of the biped robot according to the generalized acceleration vector, the vector of external force, and a preset inverse dynamics model.

It is to be noted that the apparatus embodiment shown in this embodiment matches the content of the above method embodiment, reference may be made to the contents of the above method embodiments and details are not repeated herein.

In an embodiment, a biped robot is further provided, including: a memory and a processor; the memory being configured to store a computer program executable by the processor; the processor being configured to execute the computer program in the memory to implement the method as described above.

In an embodiment, a non-transitory computer-readable storage medium, for example, a memory including instructions, is further provided. The above executable computer program may be executed by a processor. The readable storage medium may be a read-only memory (ROM), a random access memory (RAM), a Compact Disc Read-Only Memory (CD-ROM), a magnetic tape, a floppy disk, and an optical data storage device, etc.

Other implementations of the present disclosure will be apparent to those skilled in the art from consideration of the specification and practice of the solution disclosed herein. The present disclosure is intended to cover any variations, uses, or adaptations. Such variations, uses, or adaptations follow the general principles of the present disclosure and include common knowledge or customary technical means in the art not disclosed in the present disclosure. The specification and embodiments are considered as illustrative only, and the true scope and spirit of the present disclosure are indicated by the appended claims.

It will be appreciated that the present disclosure is not limited to the exact structure that has been described above and illustrated in the accompanying drawings, and that various modifications and changes may be made without departing from the scope thereof. The scope of the present disclosure is only limited by the appended claims.

What is claimed is:

1. A method for controlling a biped robot, comprising:
   acquiring a support phase of the biped robot in a current state;
   acquiring a current forward speed and a current lateral speed of a center of mass of the biped robot at an end of the support phase;
   acquiring a torque vector of an ankle joint of a support leg of the biped robot according to the current forward speed and the current lateral speed;
   acquiring a target torque vector according to the torque vector and a preset Quadratic Programming (QP) model; and
   controlling the biped robot to move according to the target torque vector,
   wherein acquiring a support phase of the biped robot in a current state, comprises:
   acquiring current time and a ground normal component force applied to a swing leg of the biped robot;
   judging whether the current time meets a first condition or a second condition and judging whether the current time and the normal component force meet a third condition; the first condition being that the current time exceeds a sum of Single Support Phase (SSP) start time and SSP duration, the second condition being that the current time exceeds a sum of Double Support Phase (DSP) start time and DSP duration, the third condition being that the current time exceeds a sum of the SSP start time and half of the SSP duration, and the normal component force being greater than a product of a preset coefficient and gravity of the biped robot; and determining that the biped robot is in a DSP when the current time meets the first condition or the current time and the normal component force meet the third condition; and determining that the biped robot is in an SSP when the current time meets the second condition.

2. The method according to claim 1, wherein the support phase comprises a Single Support Phase (SSP), the forward speed comprises a first predicted forward speed, the lateral speed comprises a first predicted lateral speed, and acquiring a current forward speed and a current lateral speed of a center of mass of the biped robot at an end of the support phase, comprises:

acquiring a first forward position, a first forward speed, a first lateral position, and a first lateral speed of the center of mass of the biped robot relative to the biped robot; and estimating the first predicted forward speed of the biped robot based on a first preset forward speed model, the first forward position, and the first forward speed, and estimating the first predicted lateral speed of the biped robot based on a first preset lateral speed model, the first lateral position, and the first lateral speed.

3. The method according to claim 2, wherein acquiring a torque vector of an ankle joint of a support leg of the biped robot according to the current forward speed and the current lateral speed, comprises:

acquiring a current-step forward speed and a current-step lateral speed of the center of mass at an end of the SSP in the current state, and a next-step forward speed and a next-step lateral speed of the center of mass in the current state; and acquiring the torque vector of the ankle joint of the support leg of the biped robot according to the current-step forward speed, the current-step lateral speed, the next-step forward speed, and the next-step lateral speed.

4. The method according to claim 3, further comprising:
acquiring a current-step forward displacement and a current-step lateral displacement of a swing leg of the biped robot relative to the center of mass when the support leg is at the end of the SSP; and acquiring a next-step forward speed and a next-step lateral speed of the swing leg according to the current-step forward displacement of the swing leg, the current-step forward speed of the center of mass, and the first predicted forward speed.

5. The method according to claim 1, wherein the support phase comprises a Double Support Phase (DSP), the forward speed comprises a second predicted forward speed, the lateral speed comprises a second predicted lateral speed, and acquiring a current forward speed and a current lateral speed of a center of mass of the biped robot at an end of the support phase, comprises:

acquiring a second forward position, a second forward speed, a second lateral position, and a second lateral speed of the center of mass of the biped robot relative to the biped robot; and estimating the second predicted forward speed of the biped robot based on a second preset forward speed model, the second forward position, and the second forward speed, and estimating the second predicted lateral speed of the biped robot based on a second preset lateral speed model, the second lateral position, and the second lateral speed.

6. The method according to claim 5, wherein acquiring a torque vector of an ankle joint of a support leg of the biped robot according to the current forward speed and the current lateral speed, comprises:

acquiring a current-step forward speed and a current-step lateral speed of the center of mass at an end of the DSP in the current state; and acquiring a torque vector of a first support leg according to the current-step forward speed and the second predicted forward speed; and acquiring a torque vector of a second support leg according to the current-step lateral speed and the second predicted lateral speed; the first support leg being a support leg in an SSP prior to the DSP, the second support leg being a swing leg in the SSP prior to the DSP.

7. A biped robot, comprising:
a memory; and
a processor,
wherein the memory is configured to store a computer program executable by the processor; the processor is configured to:
acquire a support phase of the biped robot in a current state;
acquire a current forward speed and a current lateral speed of a center of mass of the biped robot at an end of the support phase;
acquire a torque vector of an ankle joint of a support leg of the biped robot according to the current forward speed and the current lateral speed;
acquire a target torque vector according to the torque vector and a preset Quadratic Programming (QP) model; and
control the biped robot to move according to the target torque vector,
wherein the processor is configured to:
acquire current time and a ground normal component force applied to a swing leg of the biped robot;
judge whether the current time meets a first condition or a second condition and judge whether the current time and the normal component force meet a third condition; the first condition being that the current time exceeds a sum of Single Support Phase (SSP) start time and SSP duration, the second condition being that the current time exceeds a sum of Double Support Phase (DSP) start time and DSP duration, the third condition being that the current time exceeds a sum of the SSP start time and half of the SSP duration, and the normal component force being greater than a product of a preset coefficient and gravity of the biped robot; and
determine that the biped robot is in a DSP when the current time meets the first condition or the current time and the normal component force meet the third condition; and determine that the biped robot is in an SSP when the current time meets the second condition.

8. The biped robot according to claim 7, wherein the support phase comprises a Single Support Phase (SSP), the forward speed comprises a first predicted forward speed, the lateral speed comprises a first predicted lateral speed, and the processor is configured to:
acquire a first forward position, a first forward speed, a first lateral position, and a first lateral speed of the center of mass of the biped robot relative to the biped robot; and
estimate the first predicted forward speed of the biped robot based on a first preset forward speed model, the first forward position, and the first forward speed, and estimate the first predicted lateral speed of the biped robot based on a first preset lateral speed model, the first lateral position, and the first lateral speed.

9. The biped robot according to claim 8, wherein the processor is configured to:
acquire a current-step forward speed and a current-step lateral speed of the center of mass at an end of the SSP in the current state, and a next-step forward speed and a next-step lateral speed of the center of mass in the current state; and
acquire the torque vector of the ankle joint of the support leg of the biped robot according to the current-step forward speed, the current-step lateral speed, the next-step forward speed, and the next-step lateral speed.

10. The biped robot according to claim 9, wherein the processor is configured to:
acquire a current-step forward displacement and a current-step lateral displacement of the a swing leg of the biped robot relative to the center of mass when the support leg is at the end of the SSP; and
acquire a next-step forward speed and a next-step lateral speed of the swing leg according to the current-step forward displacement of the swing leg, the current-step forward speed of the center of mass, and the first predicted forward speed.

11. The biped robot according to claim 7, wherein the support phase comprises a DSP, the forward speed comprises a second predicted forward speed, the lateral speed comprises a second predicted lateral speed, and the processor is configured to:
acquire a second forward position, a second forward speed, a second lateral position, and a second lateral speed of the center of mass of the biped robot relative to the biped robot; and
estimate the second predicted forward speed of the biped robot based on a second preset forward speed model, the second forward position, and the second forward speed, and estimate the second predicted lateral speed of the biped robot based on a second preset lateral speed model, the second lateral position, and the second lateral speed.

12. The biped robot according to claim 11, wherein the processor is configured to:
acquire a current-step forward speed and a current-step lateral speed of the center of mass at an end of the DSP in the current state; and
acquire a torque vector of a first support leg according to the current-step forward speed and the second predicted forward speed; and acquire a torque vector of a second support leg according to the current-step lateral speed and the second predicted lateral speed; the first support leg being a support leg in an SSP prior to the DSP, the second support leg being a swing leg in the SSP prior to the DSP.

13. A non-transitory computer-readable storage medium having an executable computer program stored thereon, wherein the executable computer program in the storage medium is configured to cause a process to implement a method for controlling a biped robot, comprising:
acquiring a support phase of the biped robot in a current state;
acquiring a current forward speed and a current lateral speed of a center of mass of the biped robot at an end of the support phase;
acquiring a torque vector of an ankle joint of a support leg of the biped robot according to the current forward speed and the current lateral speed;
acquiring a target torque vector according to the torque vector and a preset Quadratic Programming (QP) model; and
controlling the biped robot to move according to the target torque vector,
wherein acquiring a support phase of the biped robot in a current state, comprises:
acquiring current time and a ground normal component force applied to a swing leg of the biped robot;
judging whether the current time meets a first condition or a second condition and judging whether the current time and the normal component force meet a third condition; the first condition being that the current time exceeds a sum of Single Support Phase (SSP) start time and SSP duration, the second condition being that the current time exceeds a sum of Double Support Phase (DSP) start time and DSP duration, the third condition being that the current time exceeds a sum of the SSP start time and half of the SSP duration, and the normal component force being greater than a product of a preset coefficient and gravity of the biped robot; and
determining that the biped robot is in a DSP when the current time meets the first condition or the current time and the normal component force meet the third condition; and determining that the biped robot is in an SSP when the current time meets the second condition.

14. The storage medium according to claim 13, wherein the support phase comprises a Single Support Phase (SSP), the forward speed comprises a first predicted forward speed, the lateral speed comprises a first predicted lateral speed, and acquiring a current forward speed and a current lateral speed of a center of mass of the biped robot at an end of the support phase, comprises:
acquiring a first forward position, a first forward speed, a first lateral position, and a first lateral speed of the center of mass of the biped robot relative to the biped robot; and
estimating the first predicted forward speed of the biped robot based on a first preset forward speed model, the first forward position, and the first forward speed, and estimating the first predicted lateral speed of the biped robot based on a first preset lateral speed model, the first lateral position, and the first lateral speed.

15. The storage medium according to claim 14, wherein acquiring a torque vector of an ankle joint of a support leg of the biped robot according to the current forward speed and the current lateral speed, comprises:
acquiring a current-step forward speed and a current-step lateral speed of the center of mass at an end of the SSP in the current state, and a next-step forward speed and a next-step lateral speed of the center of mass in the current state; and
acquiring the torque vector of the ankle joint of the support leg of the biped robot according to the current-step forward speed, the current-step lateral speed, the next-step forward speed, and the next-step lateral speed.

* * * * *